(12) United States Patent
Markusson

(10) Patent No.: US 11,986,895 B2
(45) Date of Patent: May 21, 2024

(54) SAW TOOTH SETTING ARRANGEMENT

(71) Applicant: MARKUSSON PROFESSIONAL GRINDER AB, Rimbo (SE)

(72) Inventor: Pär Markusson, Rimbo (SE)

(73) Assignee: MARKUSSON PROFESSIONAL GRINDER AB, Rimbo (SE)

( * ) Notice: Subject to any disclaimer, the term of this patent is extended or adjusted under 35 U.S.C. 154(b) by 0 days.

(21) Appl. No.: 17/618,199

(22) PCT Filed: Jan. 20, 2020

(86) PCT No.: PCT/SE2020/000003
§ 371 (c)(1),
(2) Date: Dec. 10, 2021

(87) PCT Pub. No.: WO2020/251439
PCT Pub. Date: Dec. 17, 2020

(65) Prior Publication Data
US 2022/0274192 A1 Sep. 1, 2022

(30) Foreign Application Priority Data
Jun. 11, 2019 (SE) .................................... 1900098-3

(51) Int. Cl.
*B23D 63/02* (2006.01)
*B23D 63/06* (2006.01)

(52) U.S. Cl.
CPC ............. *B23D 63/02* (2013.01); *B23D 63/06* (2013.01)

(58) Field of Classification Search
CPC .... B23D 63/02; B23D 63/023; B23D 63/026; B23D 63/006; B23D 63/04; B23D 63/06
(Continued)

(56) References Cited

U.S. PATENT DOCUMENTS 294,439 A * 3/1884 Charboneau ........... B23D 63/06
76/53
769,385 A * 9/1904 Huot ...................... B23D 63/02
76/68
(Continued)

FOREIGN PATENT DOCUMENTS

CA 2634090 A1 12/2009
CH 353966 A 4/1961
(Continued)

OTHER PUBLICATIONS

International Search Report Issued in connection with PCT Application No. PCT/SE2020/000003 dated May 15, 2020.

*Primary Examiner* — Laura M Lee
(74) *Attorney, Agent, or Firm* — Pearne & Gordon LLP; J. Gregory Chrisman

(57) ABSTRACT

The invention relates to an arrangement for setting saw teeth on a saw band (4), the arrangement having a base (1) through which the saw band can slide. The base has a receiving device (6) for receiving a saw tooth setting device (8). The saw tooth setting device (8) can set saw teeth in one direction. The receiving device (6) can receive the saw tooth setting device (8) on both sides of the saw band, so that the saw tooth setting device (8) received on one side can set the saw teeth in one direction and so that the saw tooth setting device (8) received on the opposite side can set saw teeth in the opposite direction. This means that although only a simple saw tooth setting device (8) arranged to be able to set saw teeth in one direction is used, the device for setting saw teeth can set them in both directions.

11 Claims, 4 Drawing Sheets

(58) Field of Classification Search
USPC .............................. 76/49, 58–65, 68, 71, 77
See application file for complete search history.

(56) References Cited

U.S. PATENT DOCUMENTS

| | | | | | |
|---|---|---|---|---|---|
| 1,078,855 | A | * | 11/1913 | Holmes | B23D 63/023 76/71 |
| 1,115,300 | A | * | 10/1914 | Freas | B23D 63/06 76/49 |
| 1,153,444 | A | * | 9/1915 | Ricker | B23D 63/06 76/49 |
| 1,188,144 | A | * | 6/1916 | Barker | B23D 63/02 76/68 |
| 1,279,156 | A | * | 9/1918 | Pribnow | B23D 63/06 76/49 |
| 1,280,079 | A | * | 9/1918 | Patterson | B23D 63/02 76/63 |
| 1,464,172 | A | * | 8/1923 | Faunce | B23D 63/023 76/61 |
| 1,481,175 | A | | 1/1924 | Anderson | |
| 1,794,695 | A | * | 3/1931 | Juhl | B23D 63/02 76/58 |
| 2,494,762 | A | * | 1/1950 | Jensen | B23D 63/023 76/68 |
| 3,067,634 | A | * | 12/1962 | Holst | B23D 63/02 76/63 |
| 5,730,032 | A | | 3/1998 | Kraft et al. | |
| 11,691,209 | B2 | * | 7/2023 | Birker | B23D 63/04 76/58 |
| 2006/0086208 | A1 | | 4/2006 | Gschwind, Sr. et al. | |

FOREIGN PATENT DOCUMENTS

DE 852639 C 10/1952
FR 1042092 A 10/1953

* cited by examiner

SAW TOOTH SETTING ARRANGEMENT

CROSS-REFERENCE TO RELATED APPLICATIONS

This is a 35 U.S.C. 371 National Stage Patent Application of International Application No. PCT/SE2020/000003, filed Jan. 20, 2020, which claims priority to Swedish application SE 1900098-3, filed Jun. 11, 20195, each of which is hereby incorporated by reference in its entirety.

The present invention relates to saw tooth setting arrangement according to the introductory portion of the independent claim.

In particular, it relates to such a saw tooth setting arrangement intended to set teeth on a saw band.

BACKGROUND OF THE INVENTION

Setting teeth means that saw teeth are alternately bent from the saw band in one direction and alternately bent in the opposite direction. The setting must be done with high degree of precision, both insofar as that each saw tooth bent in one direction are bent to the same amount, and in that saw teeth bent in the opposite directions are bent to the same amount. To achieve a completely symmetrical setting of teeth in both directions, setting of teeth with high precision is required, which is expensive.

An object of the invention is therefore to provide a saw tooth setting arrangement which can provide symmetrical setting of teeth in both directions, with a simpler design of the saw tooth setting arrangement than is possible with prior art saw tooth setting arrangements.

These and other objects are attained by a saw tooth setting arrangement according to the characterising portion of the independent claim.

SUMMARY OF THE INVENTION

The invention relates to a arrangement for setting saw teeth on a saw band 4, the arrangement comprising a base 1 through which the saw band can slide. The base is provided with a receiving device 6 for receiving a saw tooth setting device 8. The saw tooth setting device 8 is arranged to be able to set saw teeth in one direction. The receiving device 6 is designed so that it can receive the saw tooth setting device 8 on both sides of the saw band, so that the saw tooth setting device 8 received on one side of the saw band can set saw teeth in a first direction and so that the saw tooth setting device 8 received on the opposite side of the saw band can set saw teeth in a direction opposite to the first. Advantageously, This means that, even though only a simple saw tooth setting device 8 arranged to be able to set saw teeth in one direction is used, the arrangement for setting saw teeth can set them in both directions.

In an advantageous embodiment, the arrangement comprises a band feeder 2-3 which can incrementally feed the saw band 4 forward a selected number of tooth spacings.

In yet another advantageous embodiment, the receiving device 6 comprises a first rod element which projects outwards on both sides of the base at right angles to the side of the saw band 4 and wherein the saw tooth setting device 8 comprises two through openings which can receive the first rod element.

The invention further relates to such a device in which the receiving device 6 comprises a second rod element projecting outwards on both sides of the base at right angles to the side of the saw band 4 and where the saw tooth setting device 8 can rest against the second rod element.

DESCRIPTION OF A PREFERRED EMBODIMENT

Figure 1:
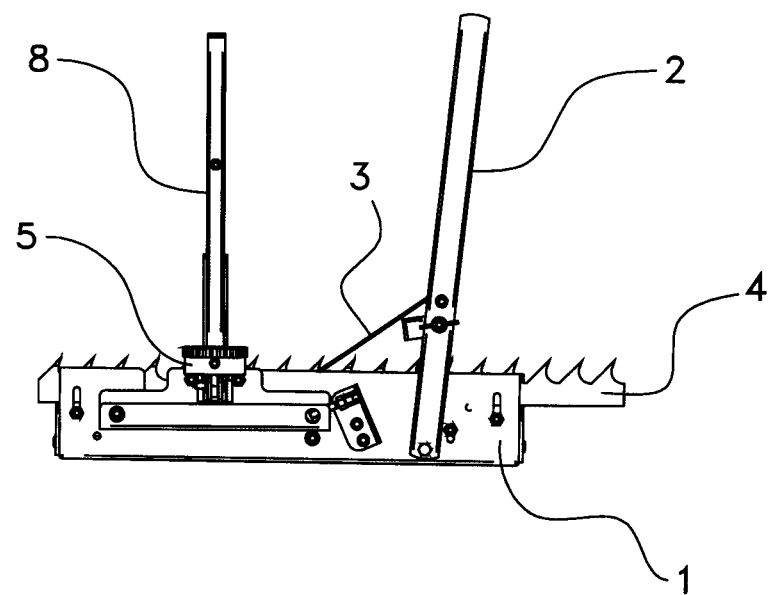
FIG. 1 shows a side view of an embodiment of an arrangement for setting saw band teeth with a feeder in a first position.
Figure 2:
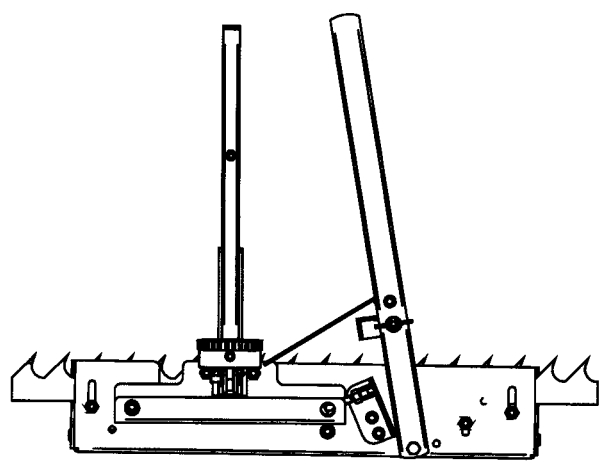
FIG. 2 shows a side view of the embodiment of the arrangement for setting saw band teeth with the feeder in a second position.
Figure 3:
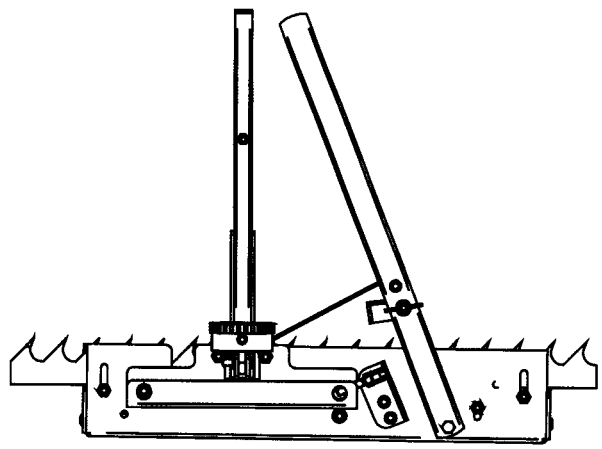
FIG. 3 shows a side view of the embodiment of the arrangement for setting saw band teeth with the feeder in a third position.

The invention relates to an arrangement for setting saw teeth on a saw band. The arrangement comprises a base over which the saw band is progressively fed to set saw tooth after saw tooth. The step-by-step process is illustrated in FIGS. 1-3. Setting means that the saw teeth are alternately bent away from the saw band towards one side and alternately bent towards the opposite side. The setting can be done in different ways, where a common way is that every other saw tooth is set in one direction, every other saw tooth is set in the opposite direction. The setting must be done with high degree of precision, both insofar as that each saw tooth bent in one direction are bent to the same amount, and in that saw teeth bent in the opposite directions are bent to the same amount.

The setting can also be more complex than setting every other to tooth the right while setting every other to tooth to the left, but for such more complex setting methods there are corresponding requirements for precision.

Figure 4:
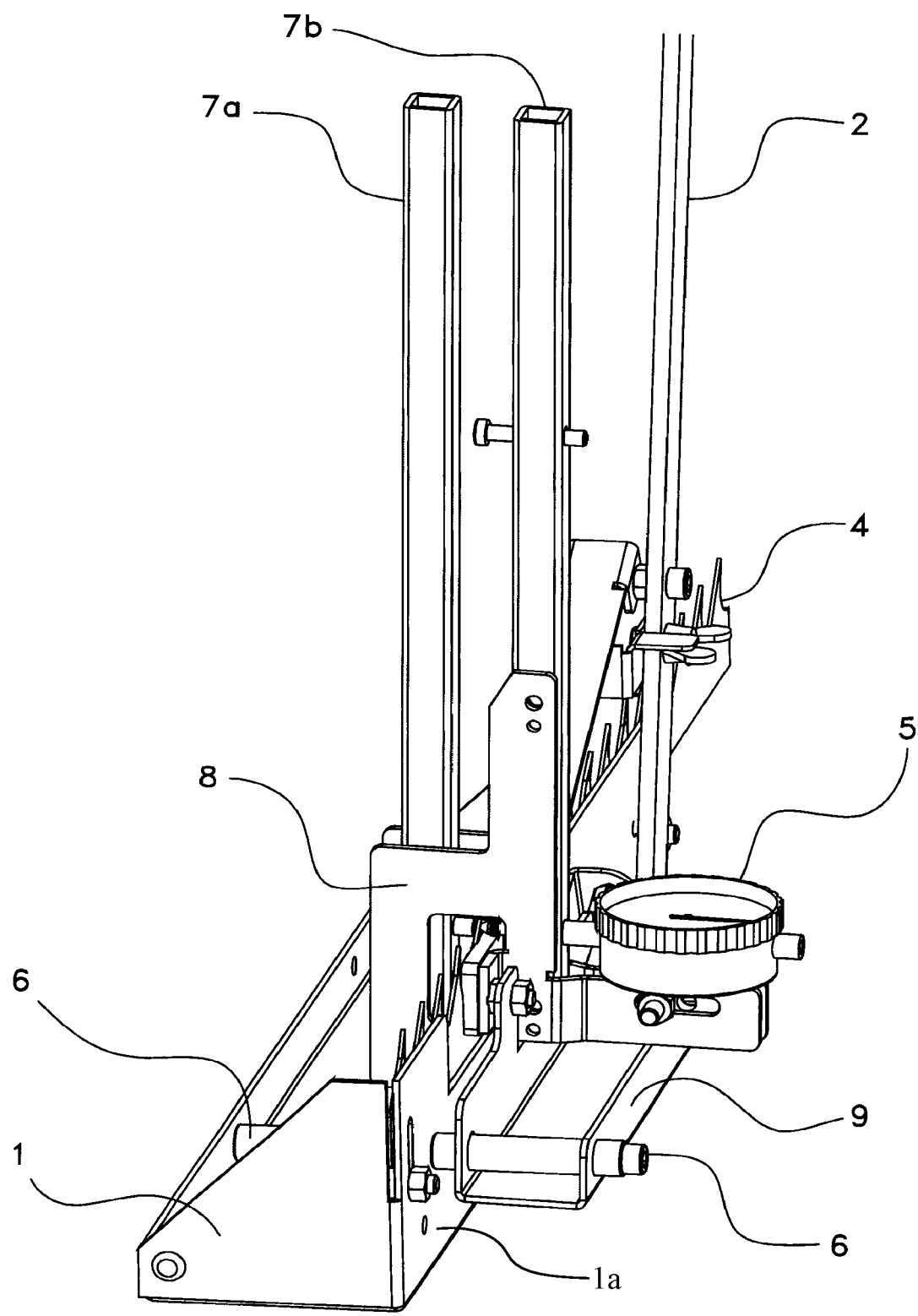
FIG. 4 shows at an angle from the front of the embodiment of the arrangement for setting saw band teeth with a saw tooth setting device oriented for setting in a first direction.
Figure 5:
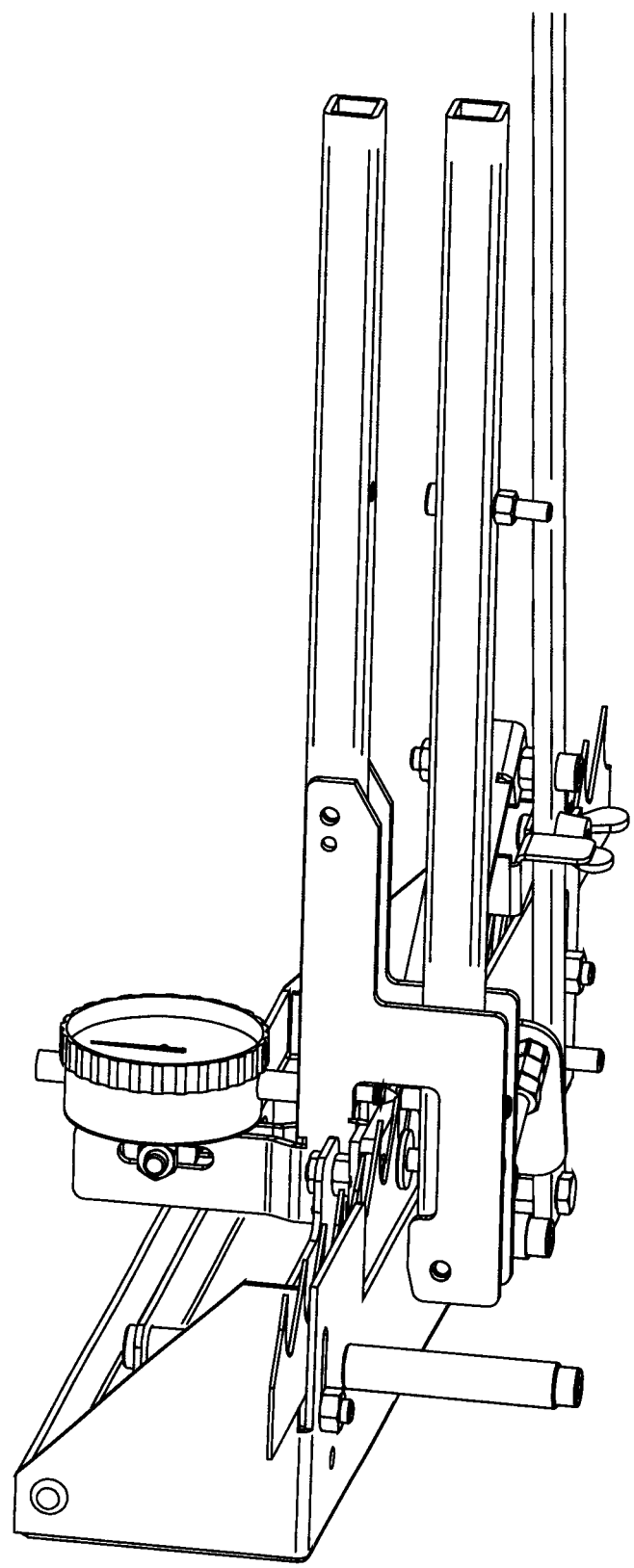
FIG. 5 shows at an angle from the front of the embodiment of the arrangement for setting saw band teeth with the saw tooth setting device oriented for setting in a second direction.
Figure 6:
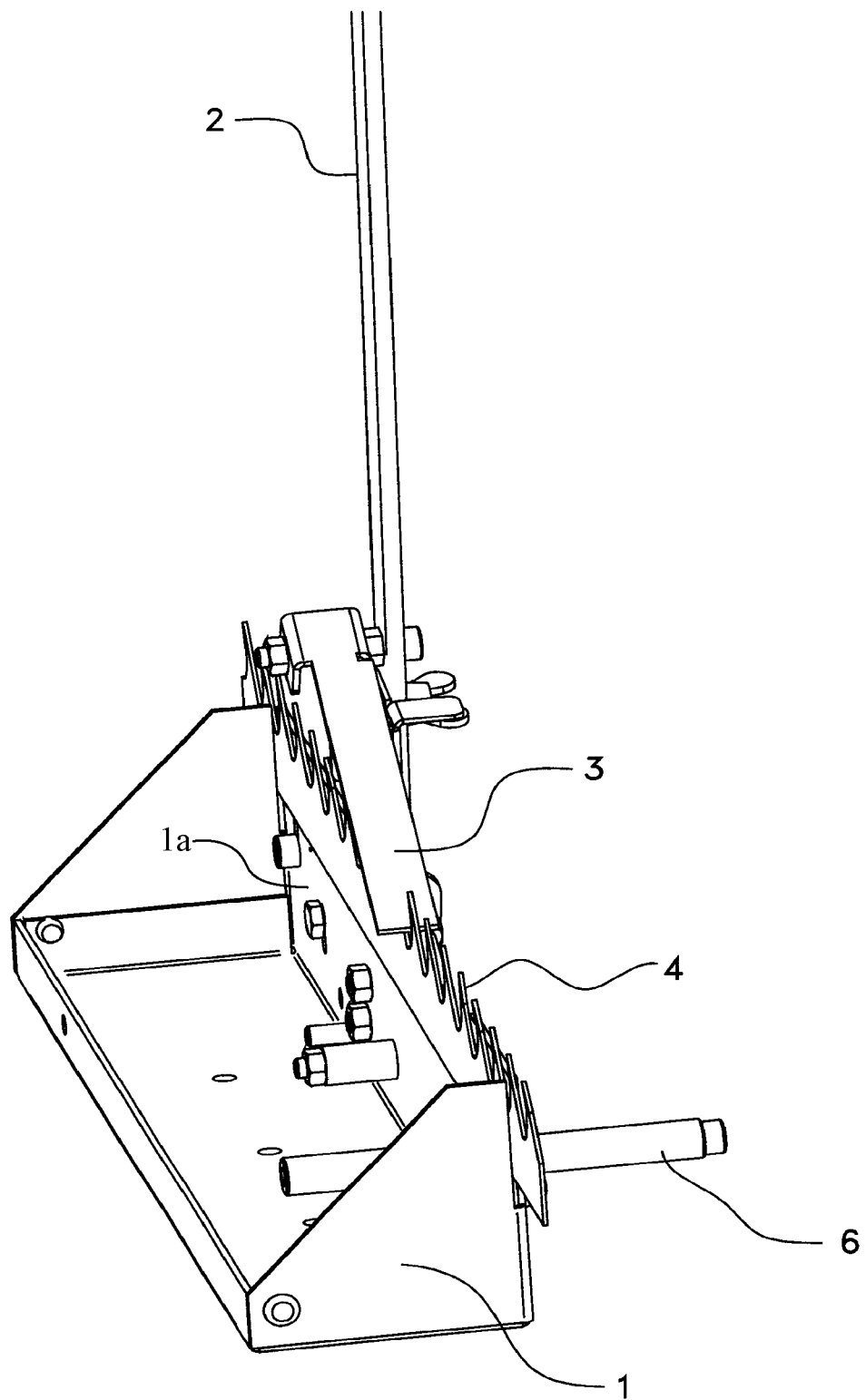
FIG. 6 shows at an angle from the front of the embodiment of the arrangement for setting saw band teeth with the saw tooth setting device removed.

The saw-tooth setting arrangement is provided with a setting device which sets one saw tooth at a time with a high degree of precision. The setting device is reversible on the base, so that the saw teeth of the saw band can be set with high degree of precision in both directions, without having to lift the saw band out of the device, turn the saw band and reset the saw band. Instead, the setting device is lifted out of the base, turned and reset on the base. Subsequently, setting of saw teeth in a direction opposite to the first can be carried out. FIGS. 4-6 show the base with the setting device mounted facing in one direction, the base with the setting device mounted facing in the opposite direction and the base with the setting device removed to more clearly illustrate the receiving device on the base which allows the setting device to be received there in two differently directed ways.

FIG. 1 shows an embodiment of a saw tooth setting arrangement for saw bands with a feeder 2 in a first position. The arrangement is here illustrated seen from the side, so that the saw band runs from left to right in the paper plane. The arrangement comprises a base 1 over which the saw band 4 runs in a groove and on which the other components are mounted. The base has a wall 1a with opposite, first and second surfaces (e.g., as shown in FIGS. 4 and 6). The arrangement comprises a saw tooth setting device 8 with a measuring dial 5 and these are more clearly illustrated in conjunction with FIGS. 4-5. The device comprises a forward feeder 2 in the form of an arm rotatably arranged around an axis. A pusher 3 extends from the feeder, from above the saw band and down to the top of the saw band. The pusher is rotatably connected to the feeder 2 about an axis at a point above the saw band.

If the feeder is angled in the direction in which the saw band is to be pushed, the pusher moves down towards the saw band until it reaches a point between two saw teeth. If the feeder is angled further in the same direction, the pusher slides forward until it reaches a saw tooth. In the figure, the pusher has reached this position, where it abuts the bottom of a saw tooth.

FIG. 2 shows the embodiment of the arrangement for setting saw band teeth with the feeder in a second position. Here, the feeder has been angled further in the same direction, so the pusher has here pushed the saw band forward a distance by pressing against the bottom of the saw tooth.

FIG. 3 shows the embodiment of the arrangement for setting saw band teeth with the feeder in a third position. Here, the feeder has been angled maximally in the same direction, so the pusher has here pushed the saw band forward a well defined distance. The feeder acts against an adjustable stop element which controls the feeding so that if the feeder is angled maximally from end position to end position, the saw band is fed a given total number of saw tooth spacings forward. For a tooth setting method where every second saw tooth is set to the right and every other to the left, the stop element is set so that the saw band is fed two full saw tooth spacings. Thus, after one full forward shift, the next saw tooth for setting is in position for setting.

FIG. 4 shows the embodiment of the arrangement for setting saw band teeth with a setting device mounted for setting in a first direction. The device is illustrated here viewed at an angle from the front, so that the saw band 4 runs towards the viewer out of the paper plane but slightly angled to the left. The saw band 4 runs in a groove in the base 1 and through the base a first fastening rod 6 extends perpendicularly to the sides of the saw band.

The saw tooth setting device 8 comprises an arm pair 7a-b, which can be manually clamped together to effect the setting. The saw tooth setting device 8 with a measuring dial 5 extends from a lower fastening member 9 through which a first through opening extends. The through opening in the fastening member 9 is here threaded over the first fastening rod 6 on one side of the base and the fastening member 9 rests at its other end on a second fastening rod, hidden by the fastening rod 9.

FIG. 5 shows the embodiment of the arrangement for setting saw band teeth with the setting unit mounted for setting in a second direction, opposite to the first. The arrangement is here illustrated viewed at an angle from the front, so that the saw band runs towards the viewer out of the paper plane but slightly angled to the left. A second through opening extends in the lower fastening member 9 of the saw tooth setting device 8. The second through opening in the fastening member 9 is here threaded over the first fastening rod 6 on one side of the base and the fastening member 9 rests at its other end on the second fastening rod, hidden by the fastening member 9.

By pushing the first fixing rod 6 into the second through opening in the lower fastening member 9 of the saw tooth setting device 8, the saw tooth setting device 8 is prevented from turning out of position when the arm pair 7a-b is manually clamped together. By resting the fastening member 9 at its other end on the second attachment rod, the saw tooth setting device 8 is positioned to set a saw tooth. With the saw tooth setting device 8 arranged on the opposite side, as in FIG. 4, the same correct positioning and angular control arise, adapted for setting in the opposite direction.

FIG. 6 shows the embodiment of the arrangement for setting saw band teeth with the setting unit removed. The arrangement is here illustrated viewed at an angle from the front, so that the saw band runs towards the viewer out of the paper plane but slightly at an angle to the right. The setting device should thus be set across the saw band, but then kept in the desired position. This is thus achieved by inserting the first fastening rod 6 into the first and second through-openings in the lower fastening member 9 of the saw tooth setting device 8, the setting device being angled about the fastening rod 6 so that its jaws are higher up than the saw band, the setting device is pushed along the fastening rod so that the jaws extend immediately above the saw band and the setting device is then angled down around the mounting rod 6 so that its jaws grip the saw band. In this position, the fastening member 9 rests at the end opposite to the used through-hole being at rest on the other attachment bar.

In the described embodiment, the saw band is progressively advanced with a manual band feeding device, but this is of course only an example. The band feeding can be accomplished with a differently designed band feeder 2-3, motor driven or manual. Similarly, the saw tooth setting device 8 is illustrated as an arm pair 7a-b, which can be manually clamped together to effect the setting. The saw tooth setting device 8 may of course, for example, have motorized jaws, so the arm pair 7a-b is then missing and is replaced with a control switch activating the motorized jaws.

In the described embodiment, a method of mounting the saw tooth setting device 8 either on one side for setting in one direction or on the other side for setting in the other direction is proposed. This is described with the first fastening rod 6 and the second fastening rod, which cooperate with respective through opening in the fastening part 9, which is a simple and well-functioning solution. This can, of course, be replaced by other means of mounting the saw tooth setting device 8 either on one side or on the other side, with screws or in other ways. Obviously, these means of mounting the saw tooth setting device 8 must place their jaws in exactly the right place around the saw tooth to be set, regardless of the direction in which the setting is to be done.

The invention claimed is:

1. An arrangement for setting saw teeth on a saw band, the arrangement comprising:
a base having a wall with opposite, first and second surfaces facing outwards and away from the base in opposite, first and second directions, respectively, and configured to receive the saw band along the first surface such that a face of the saw band is adjacent to and faces the first surface;
a receiving device comprising a first rod element projecting outwards from the first and second surfaces of the wall; and
a saw tooth setting device arranged to be able to set saw teeth in one direction, said saw tooth setting device comprising two through openings which can receive the first rod element,
wherein the receiving device is configured to receive the saw tooth setting device adjacent the first and second surfaces of the wall, wherein the saw tooth setting device is configured to be reversibly positioned on the base between first and second positions in a manner where the face of the saw band remains adjacent to and facing the first surface, wherein in the first position, the saw tooth setting device is received adjacent the first surface of the wall to set saw teeth in a first direction, and wherein in the second position the saw tooth setting device is received adjacent the second surface of the wall to set saw teeth in a second direction opposite to the first direction.

2. The arrangement according to claim 1, wherein the arrangement comprises a band feeder configured to feed the saw band forward a selected number of tooth spacings.

3. The arrangement according to claim 1, wherein the receiving device further comprises a second rod element projecting outwards from the first and second surfaces of the wall, and wherein the saw tooth setting device can rest against the second rod element.

4. The arrangement according to claim 3, wherein each of the first and second rod elements is configured to be arranged at a right angle with respect to the face of the saw band.

5. The arrangement according to claim 1, wherein the first rod element is configured to be arranged at a right angle with respect to the face of the saw band.

6. The arrangement according to claim 1, wherein the base further comprises a first plate disposed at a first longitudinal end thereof, wherein a first slot is defined between the wall and the first plate, and wherein said first slot is configured to receive the saw band.

7. The arrangement according to claim 6, wherein the base further comprises a second plate disposed at a second longitudinal end thereof, wherein a second slot is defined between the wall and the second plate, and wherein said second slot is configured to receive the saw band.

8. An arrangement for setting saw teeth on a saw band, the arrangement comprising:
- a base having a wall with opposite, first and second surfaces facing outwards and away from the base in opposite, first and second directions, respectively, and configured to receive the saw band along the first surface such that a face of the saw band is adjacent to and faces the first surface;
- a receiving device; and
- a saw tooth setting device arranged to be able to set saw teeth in one direction, wherein the receiving device is configured to receive the saw tooth setting device adjacent the first and second surfaces of the wall, wherein the saw tooth setting device is configured to be reversibly positioned on the base between first and second positions in a manner where the face of the saw band remains adjacent to and facing the first surface, wherein in the first position, the saw tooth setting device is received adjacent the first surface of the wall to set saw teeth in a first direction, and wherein in the second position the saw tooth setting device is received adjacent the second surface of the wall to set saw teeth in a second direction opposite to the first direction, wherein the tooth setting device comprises a fastening member having opposite, first and second walls that are spaced from one another, wherein when the saw tooth setting device is in the first position, an outer surface of the first wall faces the first surface of the wall of the base, and wherein when the saw tooth setting device is in the second position, an outer surface of the second wall faces the second surface of the wall of the base, and wherein the first and second walls have first and second through-holes formed therein, said first and second through-holes being coaxial and configured to receive the receiving device.

9. The arrangement according to claim 8, wherein the wall of the base has a third through-hole formed therein.

10. The arrangement according to claim 9, wherein the receiving device comprises a first rod, and wherein when the saw tooth setting device is in either the first position or the second position, the first rod is received within the first, second, and third through-holes.

11. The arrangement according to claim 10, wherein the receiving device further comprises a second rod, and wherein when the saw tooth setting device is in either the first position or the second position, the fastening members rests on the second rod.

* * * * *